Inventor
Henry Mehserle
By Frank Keipes
Attorney

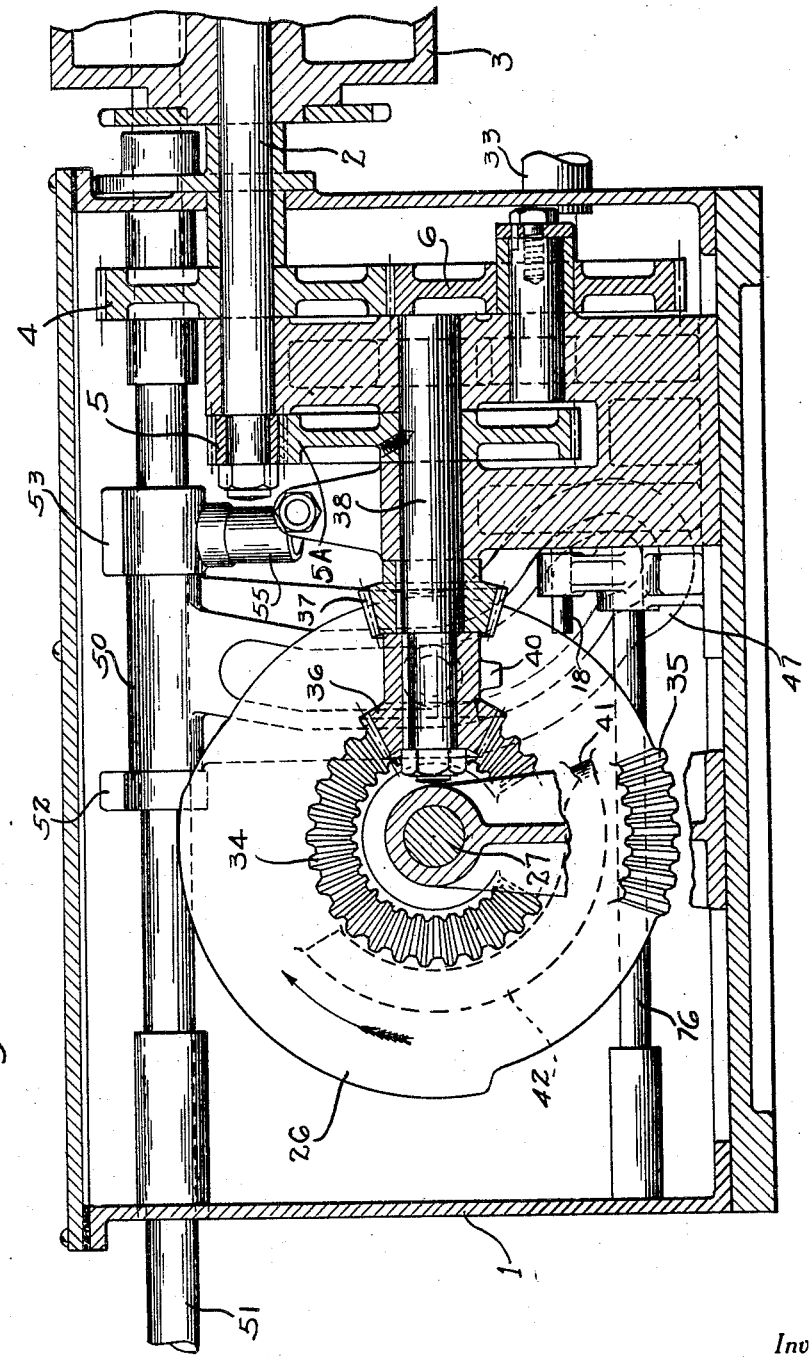

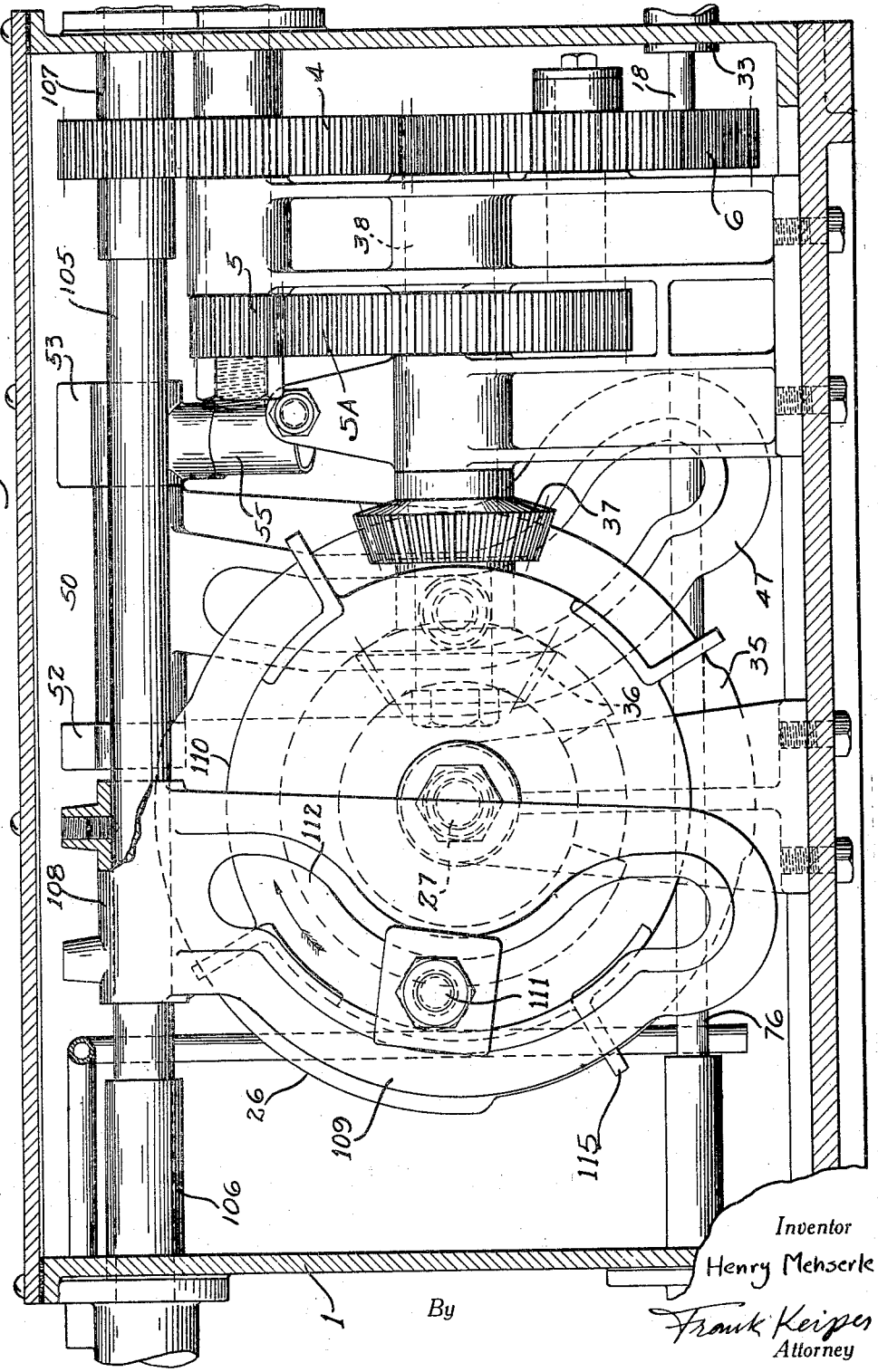

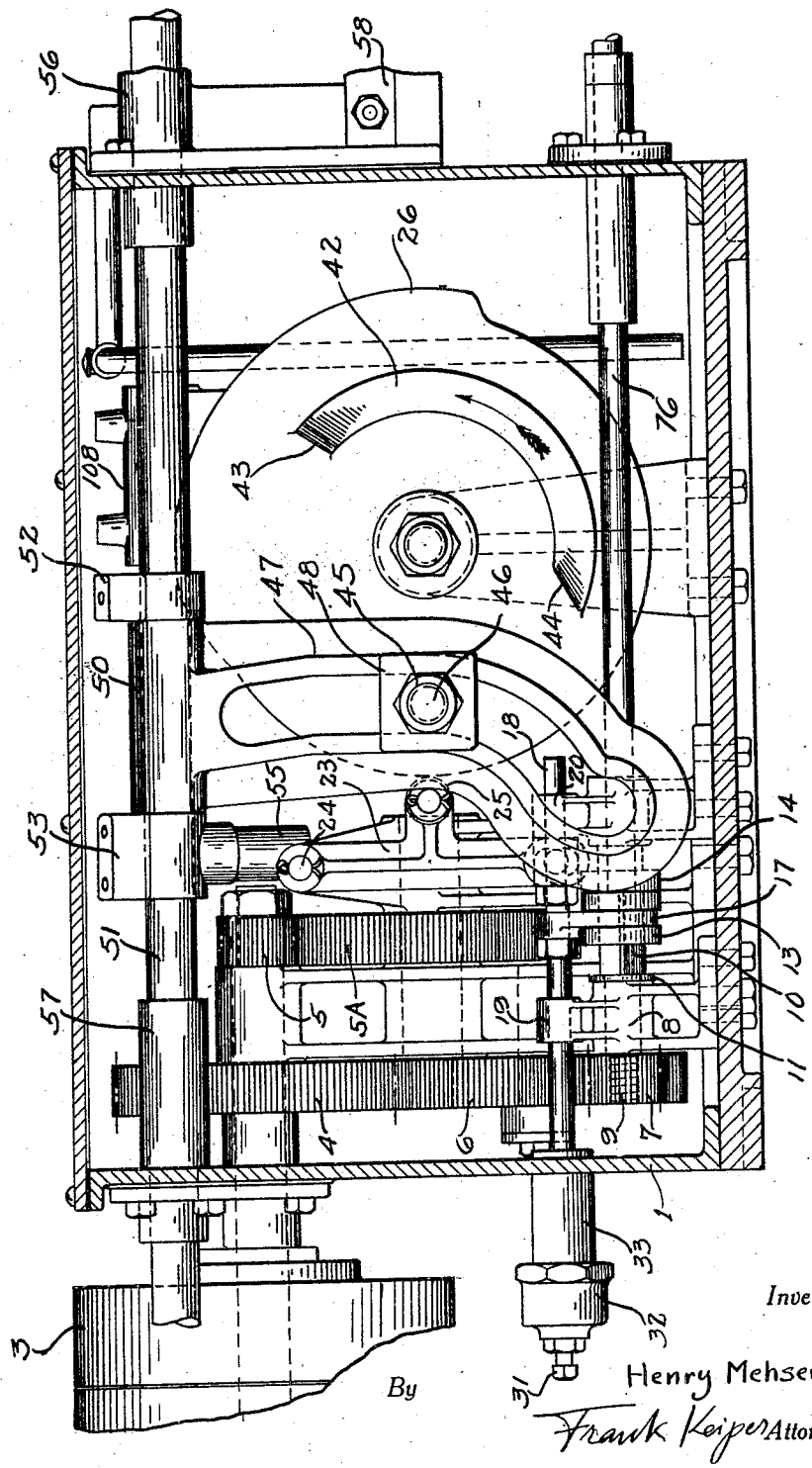

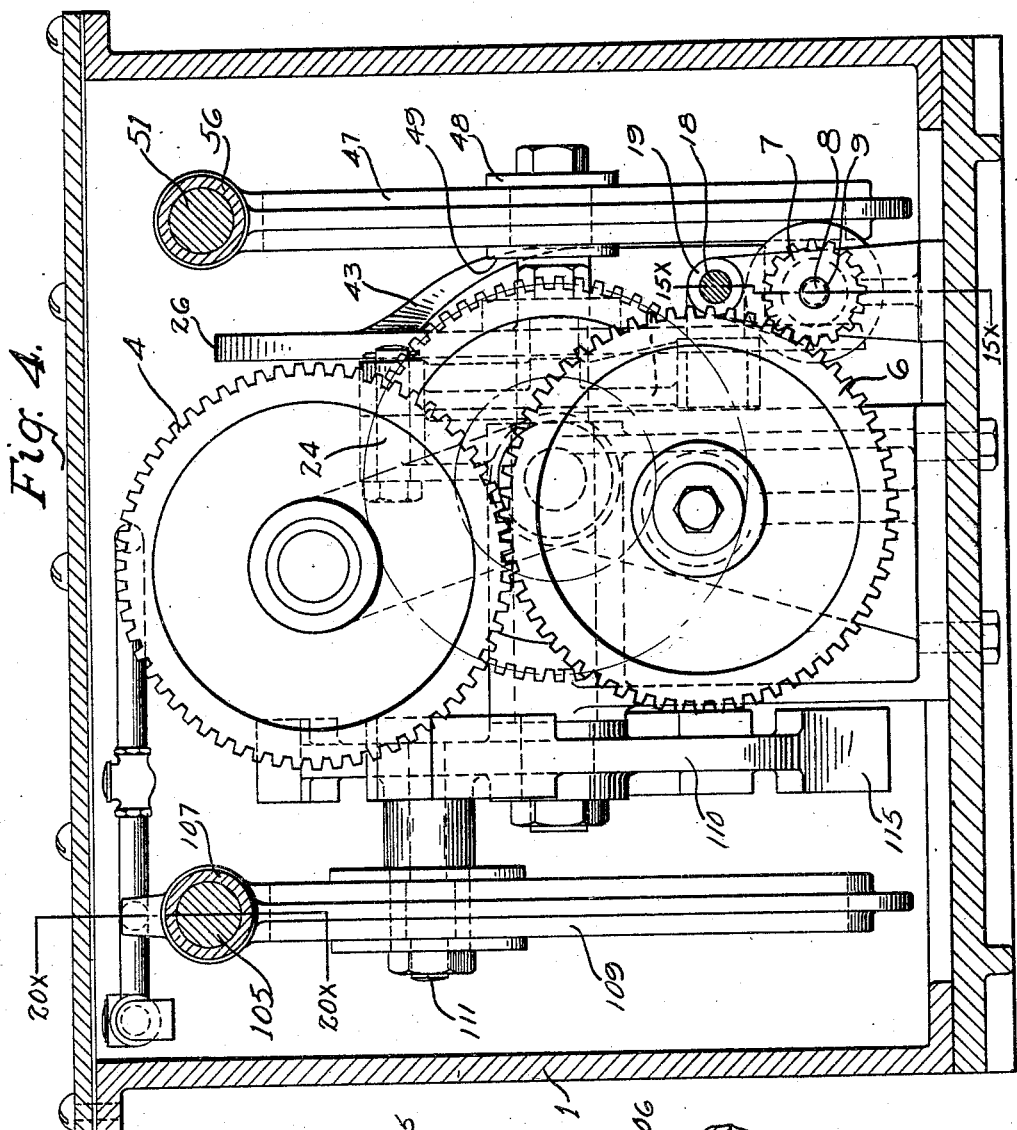
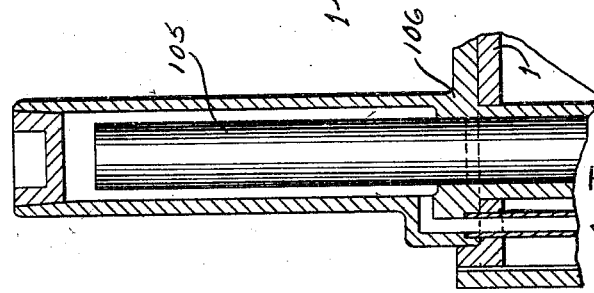

March 22, 1932. H. MEHSERLE 1,850,633
PARING MACHINE
Filed Dec. 20, 1927 10 Sheets-Sheet 6

Inventor
Henry Mehserle
By Frank Keiper
Attorney

March 22, 1932.  H. MEHSERLE  1,850,633
PARING MACHINE
Filed Dec. 20, 1927   10 Sheets-Sheet 7
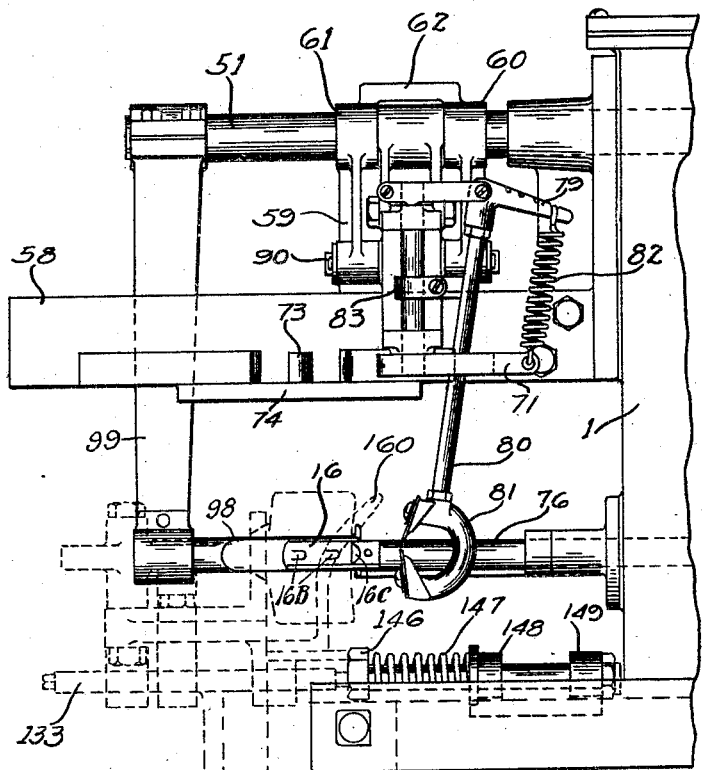
Fig. 8.
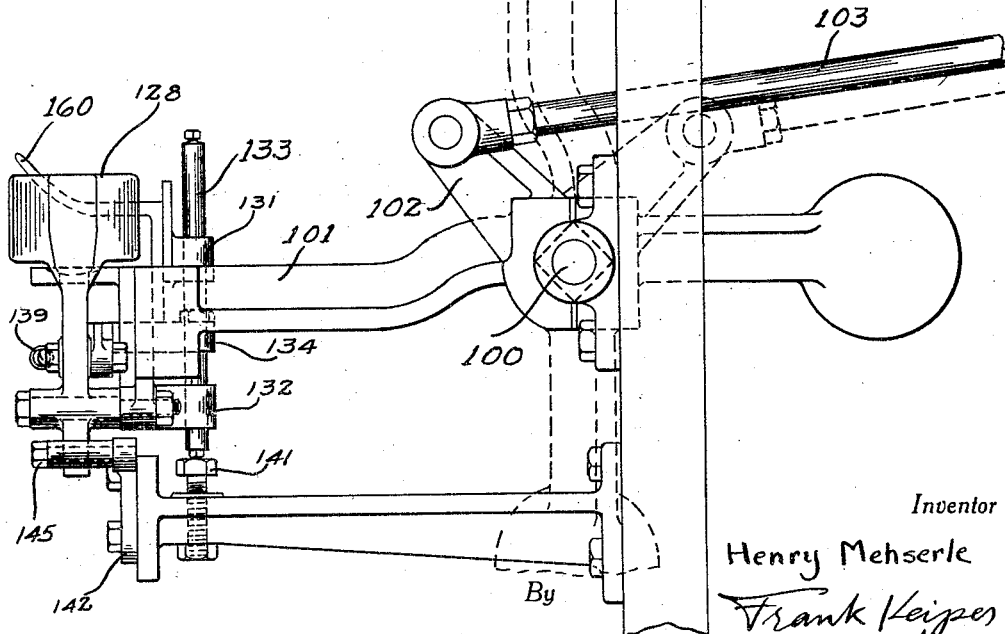
Inventor
Henry Mehserle
By Frank Keiper
Attorney

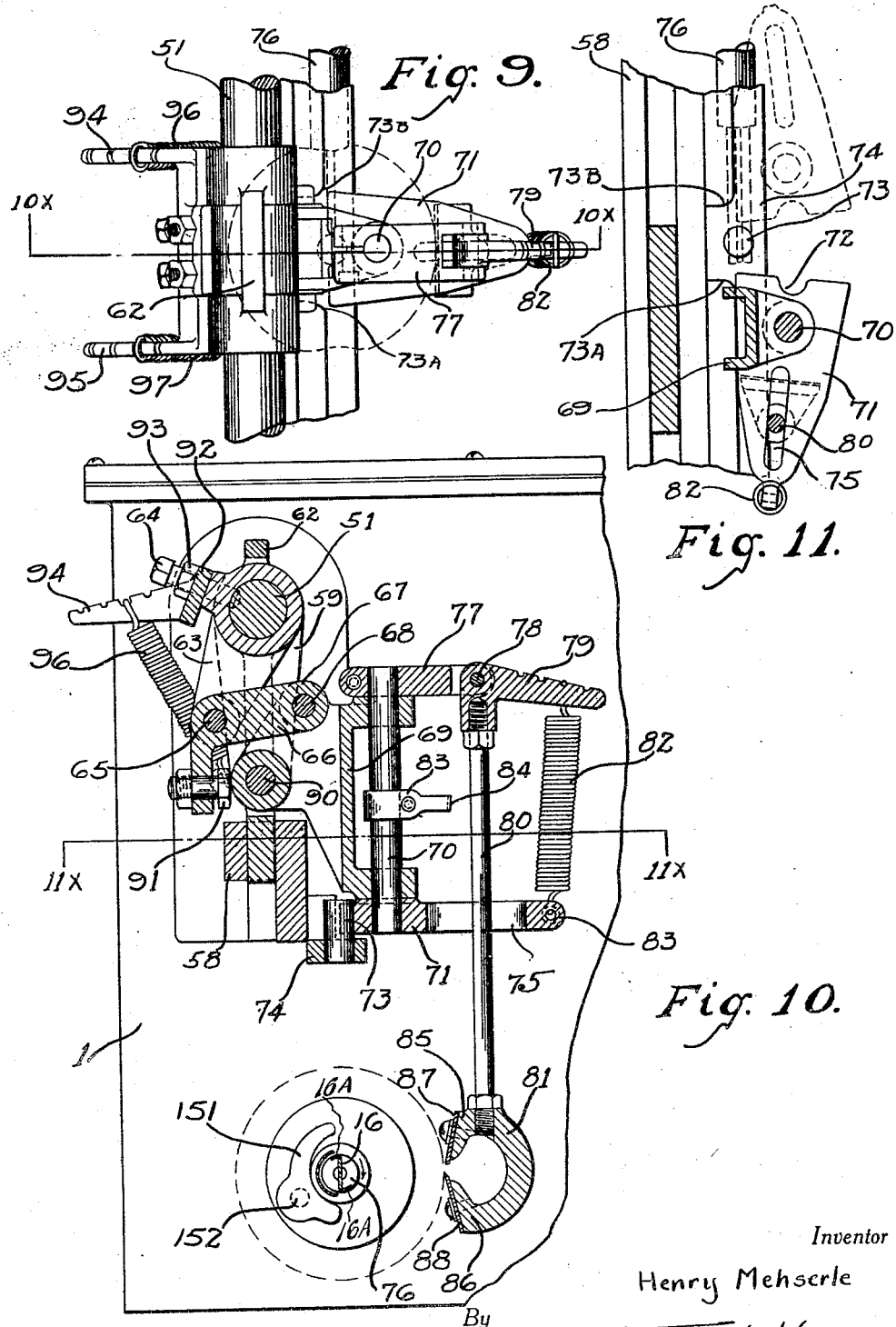

March 22, 1932. H. MEHSERLE 1,850,633
PARING MACHINE
Filed Dec. 20, 1927    10 Sheets-Sheet 9
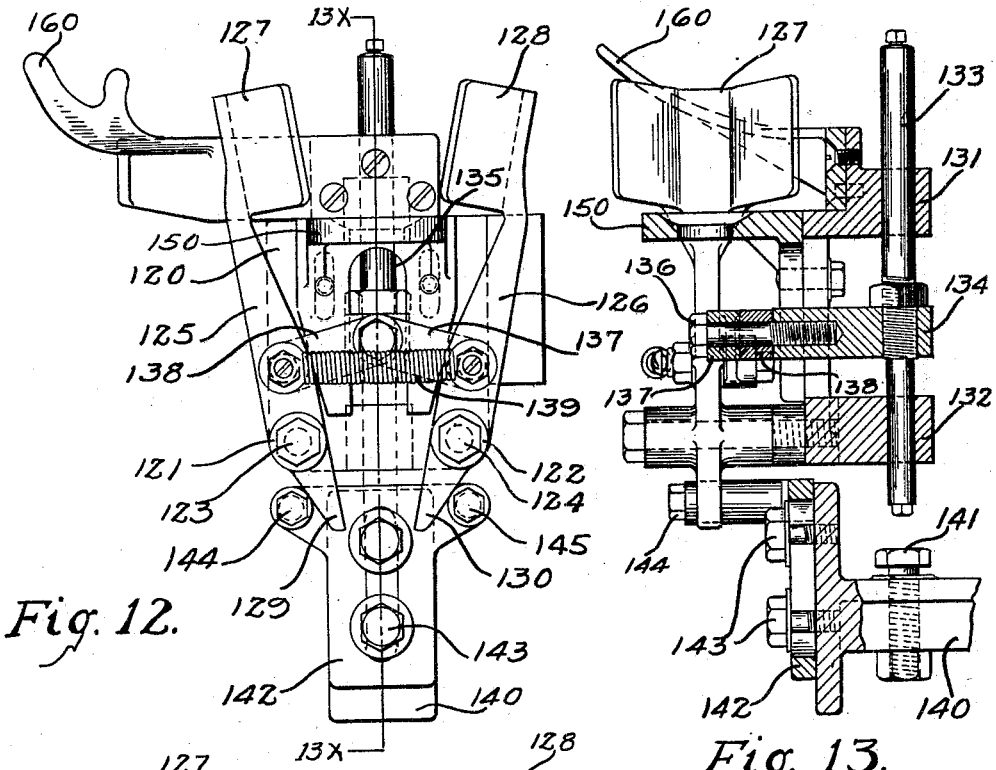
Fig. 12.
Fig. 13.
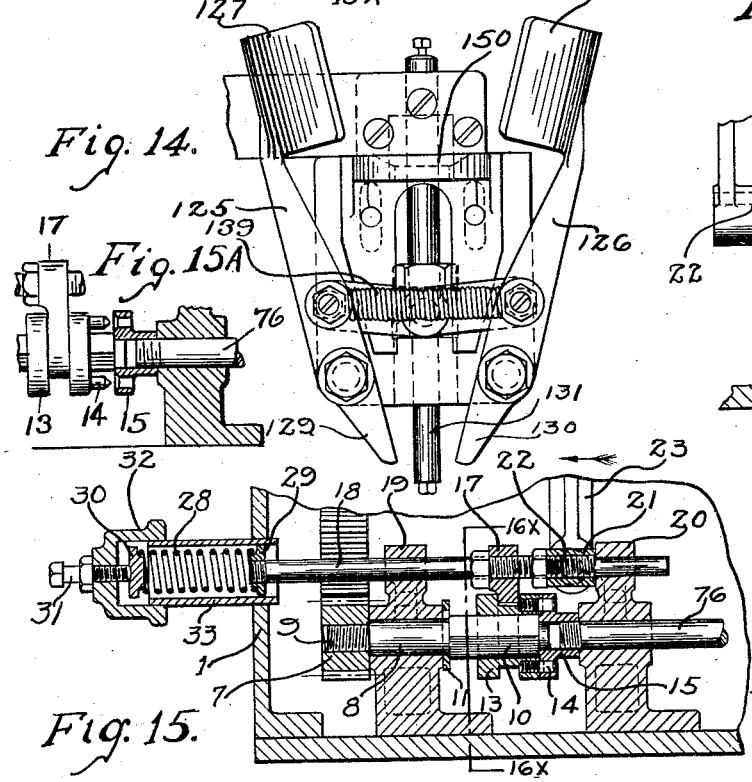
Fig. 14.
Fig. 15A.
Fig. 15.
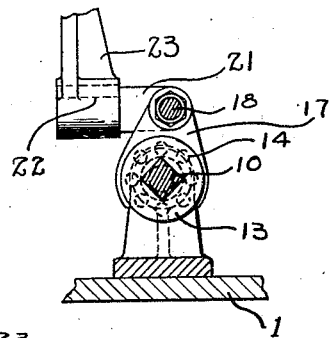
Fig. 16.
Inventor
Henry Mehserle
Frank Keizer
Attorney March 22, 1932.  H. MEHSERLE  1,850,633
PARING MACHINE
Filed Dec. 20, 1927   10 Sheets-Sheet 10

Inventor
Henry Mehserle
By Frank Keiper
Attorney

Patented Mar. 22, 1932

1,850,633

UNITED STATES PATENT OFFICE

HENRY MEHSERLE, OF ROCHESTER, NEW YORK, ASSIGNOR TO KATIE MEHSERLE, OF ROCHESTER, NEW YORK

PARING MACHINE

Application filed December 20, 1927. Serial No. 241,367.

The object of this invention is to provide a machine for feeding, paring, coring and slicing apples.

Another object of the invention is to separate the operating parts so that the driving mechanism may be enclosed in a gear casing to insure its proper lubrication and protection against rusting, the remaining parts only being exposed outside of the gear casing.

Another object is to provide mechanism that will drive the paring mechanism at a standard speed and during the paring operation and move the parts thereafter at an increased speed to return them to the starting position.

Another object is to provide an automatic feed by which the apples are placed on the spit for the peeling operation.

Another object is to provide an improved paring device and means for feeding and controlling it.

Another object is to provide an improved coring and slicing device.

Another object is to provide an improved form of clutch by which the spit is intermittently driven.

These and other objects of the invention will be fully illustrated in the drawings, described in the specification and pointed out in the claims at the end thereof.

In the drawings:

Figure 1 is a vertical longitudinal section through the machine on the line 1x—1x of Figure 5.

Figure 2 is a vertical longitudinal section through the machine on the line 2x—2x of Figure 5.

Figure 3 is a vertical longitudinal section through the machine on the line 3x—3x of Figure 5.

Figure 4 is a vertical longitudinal section through the machine on the line 4x—4x of Figure 5.

Figure 8 is a side elevation of the feeding and paring mechanism viewed from the upper right hand corner of Figure 5.

Figure 9 is a top plan view of the paring mechanism, the parts of which are shown in different position than those shown in Figure 5.

Figure 10 is a vertical section through the paring machine on the line 10x—10x of Figure 9.

Figure 11 is a horizontal section through the paring mechanism on the line 11x—11x of Figure 10, the figure being turned 90 degrees from normal.

Figure 12 is a front elevation of the clamping and feeding device by which the apple is clamped and fed to the machine, the device being shown in its lowest position with the jaws open. This is similar to the full line position of Figure 8.

Figure 13 is a vertical section through the feeding and clamping device on the line 13x—13x of Figure 12.

Figure 14 is a top plan view of the feeding and clamping device at the top of its movement corresponding to the dotted line position shown in Figure 8, in which position it stands substantially at right angles to the position shown in Figure 12.

Figure 15 is a vertical section through the clutch placed inside the gear casing, the section being taken on the line 15x—15x of Figure 4.

Figure 15—A is a detail view of the clutch of Figure 15 with the clutch members drawn apart.

Figure 16 is a vertical section on the line 16x, 16x of Figure 15.

Figure 17:
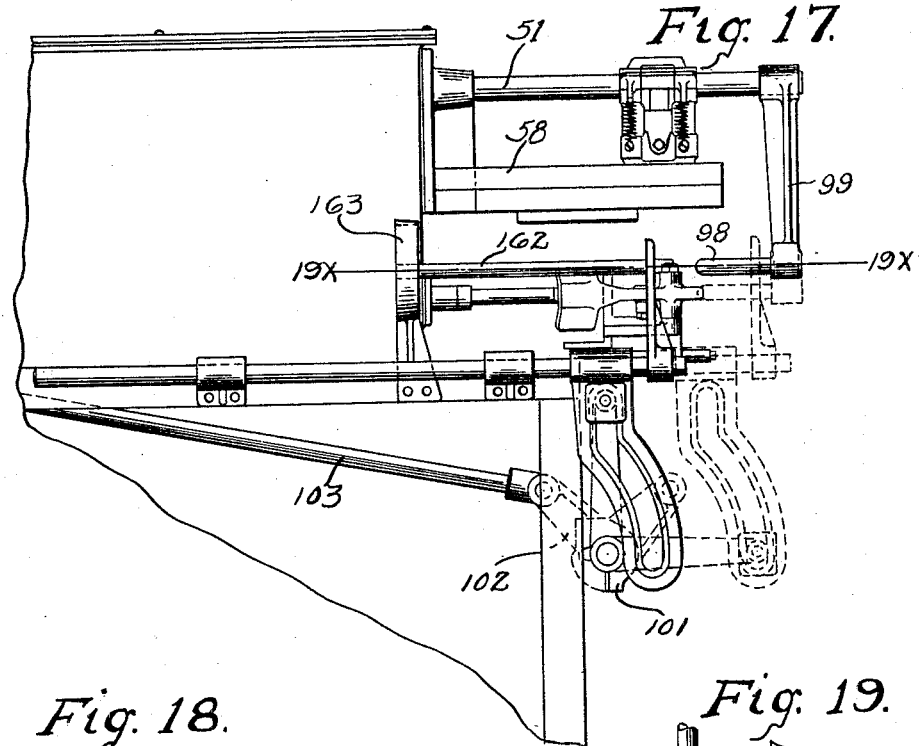

Figure 17 shows a modified form of the apple push off and the slicer that cooperates therewith.

Figures 18, 19:
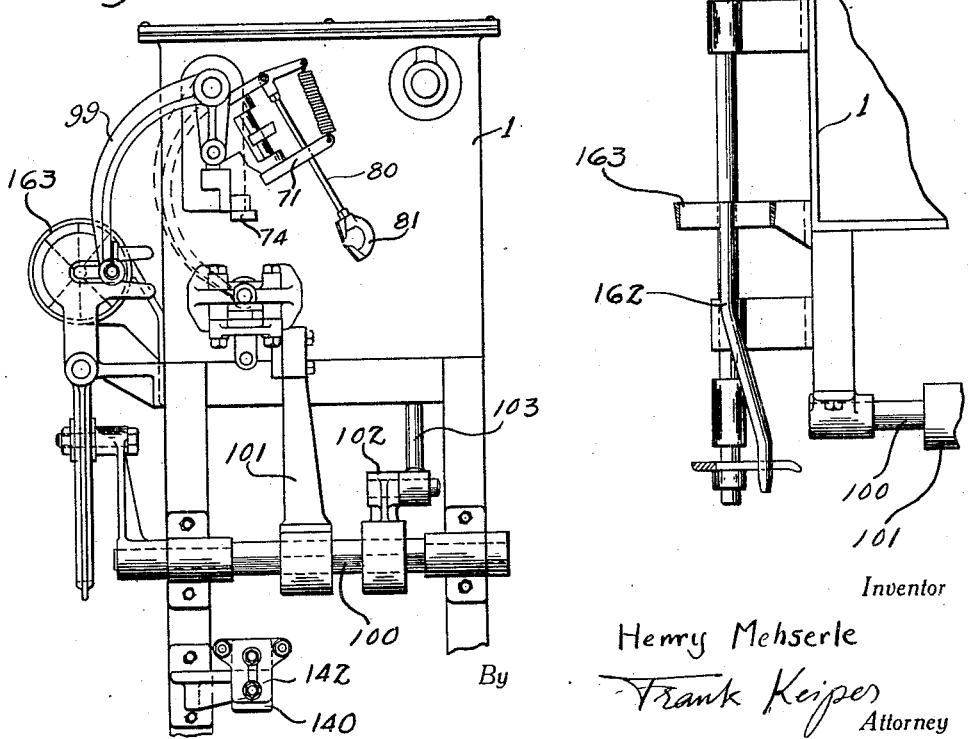

Figure 18 is a front elevation of the mechanism shown in Figure 17 viewed from the right.

Figure 19 is a horizontal section on the line 19x, 19x of Figure 17 showing the spindle to which the apples are transferred from the time they are cored until they are sliced.

Figure 20 is a longitudinal sectional view through the oil pump on the line 20x—20x of Figure 4.

In the drawings like reference numerals indicate like parts.

In the drawings reference numeral 1 indicates the box that forms the gear casing. Mounted to rotate in suitable bearings provided inside and outside of the box is the power shaft 2 which is driven by the pulley 3. Keyed to this shaft is a large gear 4 and a pinion 5. The gear 4 meshes and drives the idler 6 which meshes with and drives the pinion 7 which is rigidly fastened to the shaft 8 by a left hand thread 9. As shown in Fig. 15 the right hand end of this shaft has a square portion 10 formed therein, and a collar 11 is provided at the end of the round portion 8 which bears against the shoulder formed at the end of the square portion 10 and forms a thrust bearing thereon which engages with the end of the bearing 19. This collar 11 is keyed to the shaft 8 and rotates therewith. Splined on the square portion of the shaft 10 is a grooved shifting collar 13 having two or more pins 14 on the forward face thereof extending parallel to the shaft 8. Adjacent to this shifting collar 13 is the collar 15 having eight holes in the face thereof which holes also extend parallel to the shaft 8 and are adapted to receive the pins 14 as the sliding collar 13 is moved toward and away from the disc or collar 15. The eight holes in the collar 15 are spaced apart 45 degrees between centers so that the sliding collar 13 will complete its engagement with the collar 15 by turning not to exceed 45 degrees at any time. The collar 15 is fastened on the same shaft that carries the spit 16, and while the apple is being placed on the spit it is desirable to have the spit stationary, but after the apple has been placed on the spit it is necessary to rotate the spit in order to peel the apple. Hence the need of this clutch to drive the spit intermittently. The eight holes in the collar 15 are reamed out on the end or counter sunk so as to quicken the engagement of the pins 14 therewith and cause the spit to rotate and correspondingly shorten the idle period of the spit.

The groove in the shifting collar 13 is engaged by a shifter 17 threaded on the shaft 18 which shaft slides in the bearings 19 and 20. The shaft is threaded as shown in Fig. 15 to give adjustment to the shifter 17 which is locked in place by a nut. Also threaded on the shaft 18 is a sleeve 21 which is threaded for adjustment on the shaft and is locked in place thereon by a lock nut. This sleeve carries a stud 22 which is provided with an anti-friction roller that engages in the slot in the arm 23 that is pivoted to swing on the stud 24. This arm carries an anti-friction roller 25 that engages with the rim of the cam 26 which is keyed to the shaft 27 and by which the arm 23 is moved positively to the left in the direction indicated by the arrow in Fig. 15. The arm 23 is moved in the other direction by the spring 28 which encircles the shaft 18 and presses against a flanged collar 29 threaded on the shaft 18 by which the shaft 18 is always moved to the right as shown in Fig. 15 so that the roller 25 is firmly held against the high part of the rim of the cam 26. The cam 26 operates to open the clutch, and the spring 28 operates to close the clutch when permitted to do so after the high part of the periphery of the cam has passed the anti-friction roller 25. The roller 25 does not bear on the low part of the rim of the cam. This is prevented by the sleeve 21 engaging the stop or bearing 20 which limits the expansion of the spring 28 and lessens the wear on the roller 25 and the low part of the cam 26.

The pins 14 when fully in engagement with the collar 15 makes a positive engagement therewith and after this engagement is completed it is not necessary for the fork in the shifter 17 to put pressure on the shifting collar 13. The fork therefor puts pressure on the collar 13 only when it moves it into and out of engagement and at all other times it floats loosely in the groove of the collar and avoids unnecessary friction. The outer end of the spring 28 presses against the seat 30 which is held in place by an adjusting screw 31 threaded in a housing cap 32 which is carried on the housing 33 which is fastened in the gear casing 1 of the machine.

On the cam 26 is provided two mutilated beveled gears 34 and 35, the gear 34 having a short radius and the gear 35 having a long radius. These mutilated gears are driven by the bevel gear pinions 36 and 37 which are not mutilated and which are keyed to the shaft 38 and by which shaft they are driven with a uniform angular velocity. The shaft 38 is driven by the gear 5A which in turn is driven by the pinion 5. The gear 5A is fastened to the shaft 38 by a set screw shown in Fig. 1. On the hub of the pinion 36 is provided a pin 40 which engages with a corresponding pin 41 on the cam 26, at the opportune time to assist in the turning of the cam by the pinion, it being understood that when the first pinion 36 begins to mesh with the pinion 34, only one tooth of each is in engagement and an abnormal strain is thrown on these two engaged teeth. It is at this instant that the pin 40 engages with the pin 41, these pins serving as driving teeth which take part of the strain of increasing the angular velocity of the cam 26, thereby relieving the strain on the two teeth that are engaged in the gears 34 and 36. As soon as the engagement of the gears 34 and 36 has gone far enough to place two teeth on each gear in engagement, the assistance of the pins 40 and 41 is no longer necessary. These pins are provided for the purpose of preventing the breaking of a tooth in either gear 34 and 36 on the first engagement of the gears. The cam 26 is rotated by these pinions 36 and 37 at different angular velocities. When the pinion 36 meshes with the mutilated gear 34, the cam 26 will be rotated with a high angular velocity and when the beveled pinion 37 meshes with the mutilated gear 35 the cam 26 will be rotated with a low angular velocity. This change in the angular velocity of the cam is for the purpose of giving to the paring knife a slow forward movement during the paring operation, and a quick return movement of the knife after the paring operation is finished as will presently be described.

On the back of the plate of the cam 26 opposite to the gears 34 and 35 is provided a cam 42 which consists of a mutilated flange or rib, which is concentric with the shaft which carries the cam plate. This cam extends around the cam plate about 160 degrees. It is beveled on its forward end as indicated at 43 and terminates in an abrupt shoulder as indicated at 44 and turns in the direction shown by the arrow in Figure 3. This cam 42 extends sideways from the cam plate by about an 1¼", and is adapted to oscillate the shaft 51 that carries the arms that carries the paring mechanism and the arm that carries the coring spoon about 30 degrees as will presently be described.

On their cam plate is also provided a boss 45 on which is carried a stud 46 which in turn carries the roller that engages with the cam plate 47. On either side of the roller and engaging on opposite sides of the cam plate 47 are the side plates 48 and 49, which holds the cam plate 47 in an upright or vertical position. This stud 46 extends about three inches out from the plate 26 and the cam plate 47 which is driven thereby is offset from the cam plate 26 far enough to clear the cam 42. This is made possible by the length of the stud. This cam plate has a sleeve 50 at the upper end thereof which engages loosely with the shaft 51 so as to permit the shaft 51 to turn therein. At opposite ends of this sleeve 50 are the collars 52 and 53 which are rigidly fastened to the shaft by suitable set screws. The collar 53 has a stud thereon which supports the roller 55 which bears against the cam 42 on the rotation of the cam 26 and by which the shaft 51 is oscillated to move the paring knife away from the apple or the spit, and after the cam 42 has moved beyond the roller 55, the paring knife is released therefrom and is free to be moved toward the apple, as will presently be described.

Figure 6:
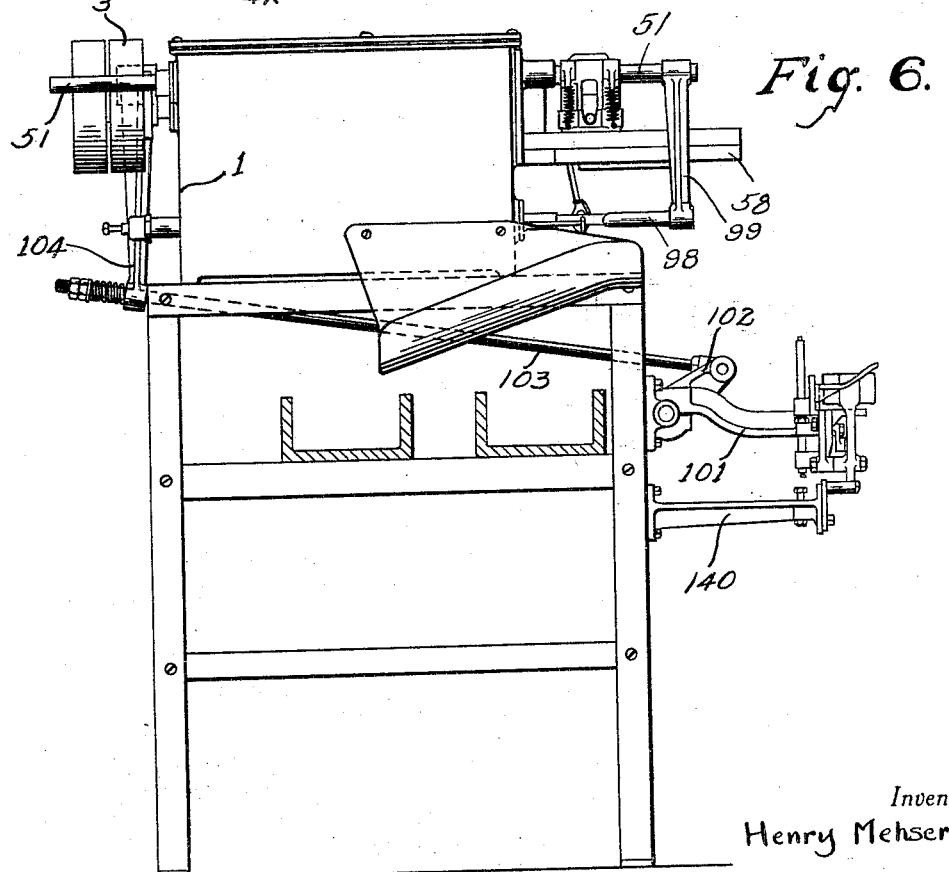
Figure 6 is a side elevation of the complete machine as viewed from the lower side of Figure 5.

The shaft 51 extends outside of the gear casing at both ends and slides and oscillates in bearings 56 and 57 provided therefor. It has an endwise movement of about 6½" and an oscillating movement of about 30 degrees. On the right hand end of the shaft and outside of the casing as shown on the right of Fig. 3, it carries the paring mechanism and the coring spoon arm, the details of which are shown in Figs. 6 and 17.

Below the shaft 51 is provided a guide 58 which is rigidly fastened to the gear casing and extends parallel to the shaft 51 and is used to partly control the moving of the paring mechanism. This guide consists of two guards suitably spaced apart to form a slot in which the lower end of the frame 59 that supports the paring mechanism makes sliding engagement.

This frame 59 has two bosses at the top 60 and 61 that make sliding engagement with the shaft 51. These bosses are connected by the yoke 62. Rigidly fastened to the shaft 51 is the crank 63 which swings with the shaft between the bosses 60 and 61. This crank is fastened to the shaft by a set screw 64. The lower end of the crank is forked and between the forks is carried the shaft 65 on which is mounted to swing the link 66 which is shaped like a bell crank. On the long arm of the link 66 is a boss 67 which carries a shaft 68 with which engages a fork carried on the turn table supporting bracket 69 that supports the upright shaft 70 which on its lower end carries the turntable 71. This turntable at its broad end as shown in Figures 9, 10 and 11 is provided with a recess 72, which pivots around the pin 73 that is stationary on the guide 74. This pin 73 and the shoulders 73A and 73B on each side of it form a stationary rack which causes the turn table to swing as it passes back and fourth. This turn table supporting bracket 69 moves with the endwise movement of the shaft 51 and in so moving, the upper left hand corner of the turntable 71 engages with the pin 73 which causes the turntable 71 to swing on the shaft 70 through an angle of about 192 degrees to the dotted line position shown at the top of Fig. 11. The turntable swings in this angle while the knife is cutting the peel off of the apple. The knife starts in at one end of the apple and turns around the apple as the apple rotates, cutting the peel off in one continuous strip as the knife advances from its position at one end of the apple to the final position at the other end of the apple. The turntable 71 is provided with an elongated slot 75 which extends from near the outer end of the turntable toward the shaft 70. The middle line of the slot 75 is slightly offset from the center of the shaft 70 as appears from Fig. 11. This permits the knife to get in closer to the center of the apple at the blow end thereof when the turntable is in the full line position of Fig. 11, and holds the knife out slightly when the turntable is in the dotted line position of Fig. 11 so that the paring knife will not come in contact with the shaft 76, this being the shaft that carries the disc or collar 15 of the clutch shown in Fig. 15.

As shown in Fig. 10 at the top of the shaft 70 is provided an arm 77 which has a forked end in which it carries a shaft 78 on which swings a bell crank lever 79, the short arm of which is threaded to receive the rod 80 on the bottom of which is carried the paring head 81. The long arm of the bell crank has notches therein with which engages the upper end of the spring 82, the lower end of which engages with the outer end 83 of the turntable 71. The slot between the forked ends of the arm 77 is offset to correspond with and to be parallel to the slot 75 in the turntable. The contraction of the spring 82 moves the knifehead 81 to the left as shown at the bottom of Fig. 10 and holds the knife against the apple. On the shaft 70 is provided a bracket 83 which is adjustably clamped thereon and which can be moved up and down thereon. This bracket is provided with a stop 84 with which the rod 80 engages and which limits the movement of the rod and the apple paring head toward the apple. This bracket is moved down on the shaft 70 when the machine is used to pare large apples, and is moved up on the shaft when the machine is used to pare small apples. The paring head comprises plates 85 and 86 which support the gauge 87 and cutting blade 88 respectively. These plates are connected by the C shaped bar 81 which leaves the plates open at the back and on both sides so that the stem and the peeling will not clog the knife, but can fall away therefrom.

The turntable bracket is mounted to swing on a shaft 90 and is provided with a boss that engages this shaft. On the lower end of the short end of the link 66 is provided an adjustable stop 91 that engages the boss of the turntable bracket by which the movement of the link 66 is limited. This stop limits the pressure of the turntable on the guide 74 so that it moves along it correspondingly easy without friction and without wear. On the boss of the crank 63 is provided a seat on which is clamped a two armed bracket 92. The set screws 64 that clamp the crank 63 to the shaft 51 pass through openings in the base of this bracket 92, and nuts 93 on the set screws 64 serve to clamp the bracket in place on the seat, and also lock the set screws 64. On this bracket is provided the two arms 94 and 95 as shown in Fig. 9. Each of these arms is provided with notches with which engage the springs 96 and 97 that rock these arms with the shaft 51 and hold the paring head and coring spoon in position during the paring operation, which position is partly fixed by the stop 91. When the paring is finished, the paring head continues to move along with the shaft 51 being driven by the cam 47 engaged by the roller 45 on the stud 46. When it reaches the end of its movement it is caused to move in the reverse direction by the quick return movement above described, and during the quick return movement the paring head is swung away from the spit by the engagement of the cam 42 with the roller 55, and after the cam has passed the roller the paring head is moved back by the springs to the original position from which it starts the paring of the apple. While the knife and coring spoon are swung away from the spit by the engagement of the cam 42 with the roller 55, the spit is exposed to receive a fresh apple.

Figure 5:
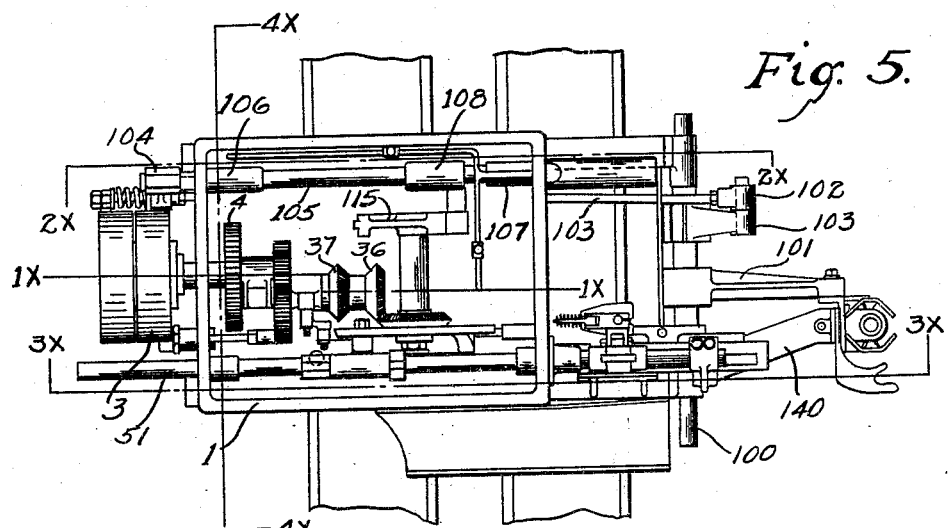
Figure 5 is a top plan view of the machine with the cover of the gear case removed.

The apples are fed mechanically to the spit by a mechanism that will now be described. Mounted across the frame of the machine below the spit is a shaft 100 on which is clamped an arm 101 which carries the apple feeding mechanism and an arm or crank 102 by which the shaft 100 and arm 101 are rocked. Connected to the arm or crank 102 is the link 103 which passes under the gear casing and is connected to the lower end of the arm 104 which is rigidly fastened to the shaft 105. This shaft 105 has an intermittent endwise movement of about 6½″ which is secured as follows: This shaft slides in a bearing 106 shown at the upper left hand corner of Figures 2 and 5 and in a bearing 107 at the upper right hand corner of Figures 2 and 5. On this shaft is provided a sleeve 108 clamped in place thereon by set screws from which sleeve extends downwardly a cam 109. In the gear casing is provided a rotating plate 110 which carries a stud 111 which is provided with a roller that engages in the slot 112 of the cam 109 and as the plate 110 rotates the shaft 105 is moved endwise corresponding to the shape of the cam slot and the movement of the stud 111 therewith. This plate 110 is also provided with blades 115 thereon which serve to splash oil in the gear casing and assists the lubrication of the machine thereby. By this means the shaft 105 and the link 103 is given an intermittent and irregular cycle of movements by which the mechanical feed for the apples is operated, which feed will now be described.

Carried on the end of the arm 101 is the jaw plate 120 on the bottom of which is provided bosses 121 and 122 in which are mounted studs 123 and 124. On these studs are mounted to rock arms 125 and 126 on the upper end of which are carried the jaws 127 and 128. On the lower end of these arms are carried the extension fingers 129 and 130 which are for the purpose of holding the jaws open, when the parts are in the position shown in Figure 12. The parts are in this position when the jaws are ready to receive the apple. Mounted on the back of the plate 120 are the guides 131 and 132. Mounted to slide in these guides is the rod 133. This rod is threaded into a cross head 134 which slides in a slot 135 in the plate 120. In this cross head is carried a stud 136 on which is mounted to swing the links 137 and 138 forming a toggle. The outer ends of these links are connected to the arms 125 and 126. These arms 125 and 126 are normally drawn together by the spring 139. When the rod 133 is pushed down it carries the stud 136 with it and carries the toggle over the center to the position shown in Figure 14 holding the jaws spread apart against the pull of the spring 139.

Figure 7:
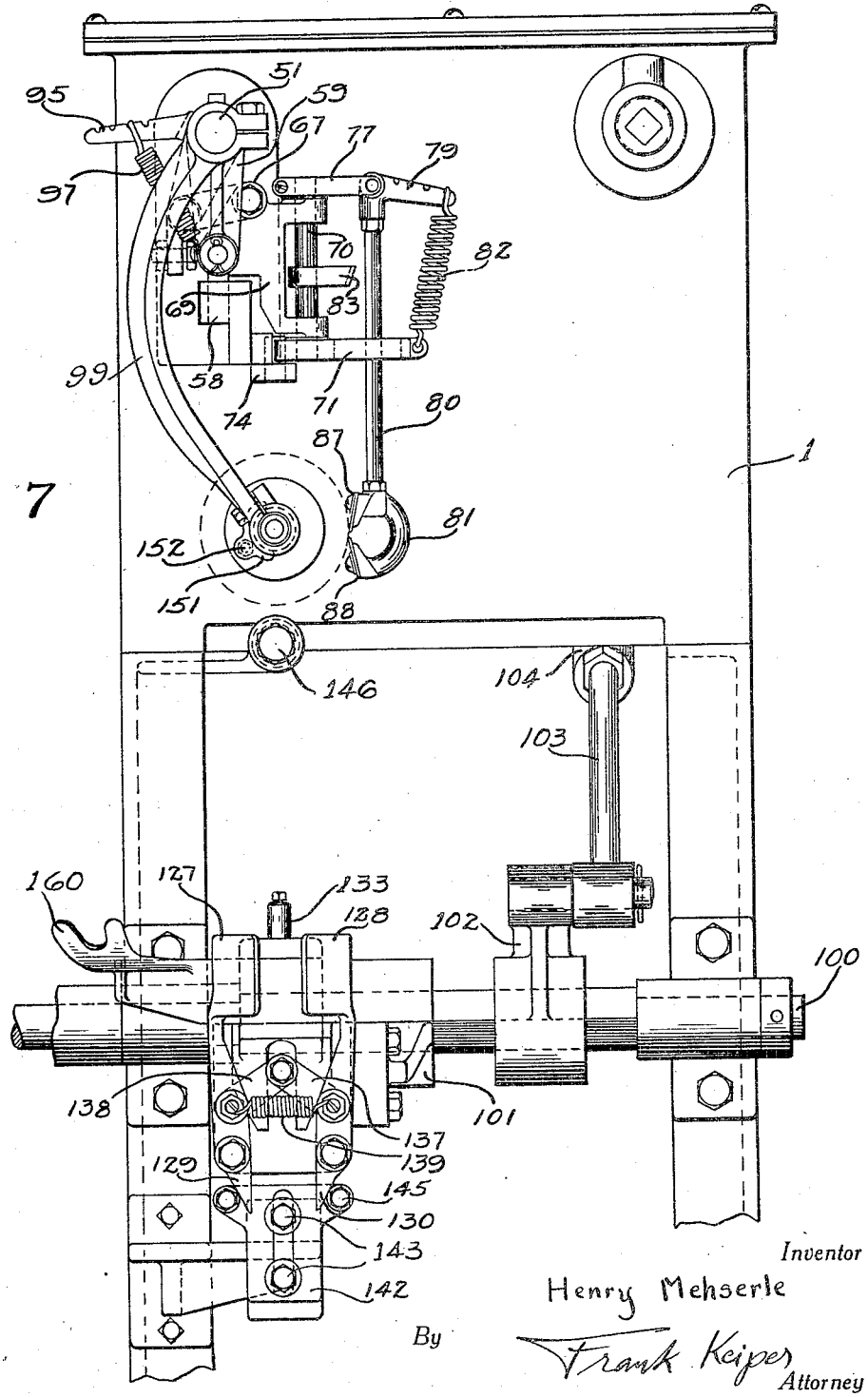
Figure 7 is a front elevation of the machine showing the feeding and paring mechanism.

Mounted on the frame of the machine is the bracket 140 near the outer end of which is provided an adjustable screw 141 with which the lower end of the rod 133 engages and by which it is lifted to throw the toggle over the center from the position shown in Fig. 14 after which the parts are arrested in the position shown in Fig. 12 by the device that will now be described. On the outer end of the bracket 140 is provided the plate 142 which has a slot centrally therein. It is clamped to the end of the bracket 140 by means of bolts 143 as shown at the bottom of Fig. 7. This permits the vertical adjustment of this plate 142, and permits the clamping of it in any position up or down. Near the top of this plate are provided the studs 144 and 145 each of which studs is provided with an anti-friction roller with which engages the lower end 129 and 130 of the arms 125 and 126 as the jaws move down and by these rollers the lower ends of the arms are held or moved together and the upper ends of the arms and the jaws are held or moved apart. As the jaws move down, they are held apart in the position shown in Figure 14. When the rod 133 strikes the stop 141 the toggle is tripped permitting the spring to draw the jaws together but the further downward movement of the jaws causes the lower ends 129 and 130 to engage the rollers on the studs 144 and 145 spreading the jaws again to the position shown in Figure 12, in which position the jaws are ready to receive an apple. As stated above, the plate 142 is adjustable up or down and by adjusting it up or down, the position of the jaws can be varied from the position shown in Figure 12, and in Figure 7 I have shown the plate set lower with the result that the jaws are permitted to come closer together at the starting point where it is intended to receive the apple. If the machine is intended to work on small apples, the plate will be set down as indicated in Figure 7 bringing the jaws closer together, but if the machine is intended to work on large apples, the plate will be set higher as indicated in Figure 12 causing the jaws to stand further apart and permitting the insertion of a larger apple. As soon as the arm 101 begins to swing up, the spring 139 draws the jaws together on the apple and centers it and clamps it in place so that it will be accurately positioned on the spit. As the apple is impaled on the spit, the rod 133 strikes a stop which forces it down from its highest position causing the jaws to open again so as to release the apple and permit it to turn with the spit. For this purpose I provide in the machine a stud 146 which is threaded and which may be adjusted in or out, and with which the rod 133 makes contact as shown in the middle of Figure 8 where the stud is shown in full line and the rod 133 is shown in dotted lines. The stud 146 is surrounded by a spring 147 which permits it to yield, the stud being permitted to slide in guides 148 and 149. With this arrangement with one setting of the stud 146 and the rod 132, the machine will take care of and open the jaws properly for all sizes of apples without any danger of breaking these particular parts of the machine.

To support the apple while the jaws are closing on it, a plate 150 is provided which is adjusted up and down as shown in Figure 12. This plate is cup shaped as shown at the top of Figs. 13 and 14 and the shape of the plate helps to center the apple and put it in the correct position. When the jaws are raised to place the apple on the spit this plate gives the end thrust to the apple that forces it on the spit. The apple is pushed along the spit until it encounters the plate 151 carried on the rod 152 on which it is adjustable in or out. When this plate is set in position, it does not yield during the operation of putting an apple on the spit. If the apple is too large, the plate 150 must yield, and to permit this to yield a spring is provided on the rod 103 as shown at the left hand end of the rod in Fig. 6. This avoids crushing the apple or jamming the machine.

The coordination of certain parts of the machine will now be described.

The stud 111 shown in Figure 2 carried on the rotating plate 110 rotates in the direction indicated by the arrow shown in Fig. 2, and in the position shown in Fig. 2 it will hold the cam 109 stationary because the slot in the cam is concentric with the center of rotation of the stud. When the stud with its anti-friction roller approaches the vertical center, it begins to push the plate 109 to the right and continues to push it to the right at a certain velocity as the stud ascends above the concentric part of the cam and comes down again to this concentric part. When the anti-friction roller reaches the concentric portion of the cam on its downward movement it pushes the cam plate to the right with an increased velocity, and continues to push it with an increased velocity until the roller passes the horizontal center. At that point the movement of the cam 109 to the right is arrested and the movement to the left begins with a quick return movement which slows down as it approaches the vertical center at the bottom and stops entirely after the vertical center has been passed by a comparatively small angle. Thereafter the plate is again held stationary by the engagement of the roller with the concentric portion of the slot. The cam slot is shaped so as to make the starting and stopping, and the change in velocity gradual so as to avoid jerking and unnecessary strain. When the anti-friction roller is passing through the concentric portion of the cam as shown on the left in Fig. 2, the cam is held idle and the feeding jaws are held in the position shown at the bottom of Figure 8. It is at this point that the apple is placed in the feeding jaws. When the roller gets to the top of the concentric portion of this cam, the cam begins to move and then the feeding jaws close and the feeding device begins to raise, and the apple is carried toward the spit. When the stud 111 is on the right hand side on the horizontal center, the cam plate has made its further movement to the right and it is at this instant that the pushing of the apple on the spit has been completed as shown in dotted lines in the middle of Figure 8. Thereafter the gripping jaws open, and the feeding device begins its return movement as the stud moves down from the horizontal center past the vertical center to the place where it holds the cam idle, and during this movement the feeding device returns to the position shown in full line at the bottom of Figure 8.

It will be understood that the cam 26 and plate 110 are both keyed to the same shaft and rotate in unison the angular velocity being varied by the mutilated gears shown in Figure 1.

The stud 46 rotates with the cam 26 in the direction shown by the arrow in Figure 3 and in the direction as shown by the arrow in Figure 1, Figure 1 showing the opposite side of the same plate.

The stud 46 with its anti-friction roller engages the cam 47. As shown in Figures 1, 2 and 3 the cam 47 is in the position that it will occupy when the paring of the apple has been completed and the knife has gone to the end of its movement beyond the apple.

As the stud moves down to the right it causes the knife to move back to the starting point with a quick return motion, the most of which movement is completed when the stud 46 gets to the bottom of the vertical center line of the cam 26, and thereafter the plate 47 moves to the right in Figure 3 a little further with a gradually reducing movement until it comes to rest when the stud engages the concentric portion of the cam.

The quick return motion is due to the combined effect of the pinion 36 and mutilated gear 34 shown in Figure 1 and the cam 47, it being understood that the plate 26 moves with an increased angular velocity while the pinion 36 meshes with the mutilated gear 34 and it is during this part of the rotation of the plate 26 that the stud 46 is moving downward in the lower half of the cam from the positions shown in Figures 1 and 3. This gearing and the cam causes the plate to have its quickest movement. During this quick return motion caused by the cam 47 and the gearing, the coring spoon and the knife move back from the forward end of their movement, and in this backward movement the coring spoon carries the apple back with it and away from the spit, and as they approach the end of this movement, the cam 42 operates to cause the coring spoon and the knife to move from the position in which the coring spoon is concentric with the spit, and the knife is almost in line with the spit to the position shown in Figure 18, the coring spoon swinging to the left, and the knife swinging to the right to permit the feeding device to pass between them and place another apple on the spit. The coring spoon and the knife remain spread apart in this position until the feeding device moves in the reverse direction to its starting point to receive another apple. Thereafter the coring spoon moves back to a position concentric with the spit, and the knife moves to the position in which it will start the peeling of the apple and the cycle of operations will be repeated indefinitely in this way. The coring spoon removes the apple from the spit because it is a half cylinder in width as is shown in Figure 8, or substantially a half cylinder in width as is shown in Figure 10. While the coring spoon is held in this left hand position, the apple is removed therefrom by the fingers carried on the stripper plate 160 carried on the feeding device which at that time is carrying a fresh apple up toward the spit. When the apple is removed from the coring spoon, it is transferred to a stationary rod 162 which passes through the hole in the apple that has been made by the coring device. A series of apples are strung on this rod one after another, each apple that is transferred to the rod pushing the apples ahead of it along the rod. The foremost apple on the rod comes into contact with the slicing device 163 which consists of a series of knives set radially in a frame through which the apples are pushed. These knives cut the apples into quarters or eighths or any other number of segments that may be desired corresponding to the number of knives that are placed in the slicing device.

When the stud 46 is 180 degrees from the position shown in Figure 3, the plate 47 begins to move to the left with a motion that is due to the combined effects of the action of the stud 46 and its anti-friction roller on the upper part of the cam 47 and the mutilated gear 34 and the pinion 36. This movement continues until the stud has approached within about 70 degrees of the vertical center. Thereupon the mutilated gear 35 meshes with the pinion 37 and is driven by it and the cam 26 thereupon rotates with a reduced angular velocity which continues uniform during the peeling of the apple. The peeling of the apple is completely performed while the mutilated gear 35 is in mesh with the pinion 37. After the peeling of the apple has been completed then the pinion 36 meshes with the mutilated gear 34 and drives the cam 26 again with an increased angular velocity carrying the knife beyond the apple and causing the coring spoon to finish coring the apple, it being understood that the coring spoon begins to enter the apple when the apple is about half peeled, the coring spoon following the knife by an interval of about 1½".

It will be understood that the gear casing is oil tight and has two or three inches of oil in the bottom thereof so that all the moving parts in the gear casing will be lubricated by splash lubrication. This is supplemented by forced lubrication for which purpose a pump is placed on the end of the rod 105 outside of the casing, the piston of which pump reciprocates with the rod 105. This pump draws oil from the bottom of the gear casing and forces it out through the various parts of the machine in the gear casing that needs special lubrication.

It will also be understood that when the knife returns it knocks the core of the preceding apple off the spit. If it fails to do this the next apple placed on the spit will push the core off the spit. See Figures 8 and 10. The shape of the spit is shown in Figures 8 and 10. The spit consists of a web with a flange 16A turned up on each side edge thereof and one or more teeth 16B struck up in the web and extending rearwardly thereof. The spit is adapted to slit the core of the apple lengthwise into two halves from one end to near the other end as the apple is pushed on the spit. When the corer cuts the core from the apple it leaves a thin shell of the apple outside of the spit that is adapted to lightly hold the two halves of the core together on the spit. The corer then removes the apple from the spit leaving the core in place on the spit. The base at the rear of the spit is tapered or beveled at 16C. When the feeder operates to put the next apple on the spit, the fresh apple pushes ahead of it the core of the preceding apple, and the bevel at the base of the spit splits the core apart in two halves which will then drop off the spit or be thrown off by the subsequent rotation of the spit. The relation of the parts for this purpose are shown in Figs. 8 and 10, and the spit rotates in the direction of the arrow shown in Fig. 10. The spit and mounting thereof is substantially the same as is shown in my previous application No. 220,034 filed Sept. 16, 1927.

While I have described this as an apple paring machine it will be understood that it can be used to pare other fruits such as pears, quinces, etc.

I claim:

1. In an apple paring machine, a plate mounted to rotate therein, said plate having a cam on the periphery thereof, an arm mounted to swing in line therewith, an anti-friction roller carried on said arm adapted to be engaged by the high part of the cam, said arm having a slot formed on the lower end thereof, a spit, a clutch member adapted to drive the spit, connections between said clutch member and said slotted arm by which the clutch member is moved on the rotation of the cam to open the clutch and permit the closing of the clutch.

2. In a paring machine, a revolving spit capable of supporting an apple, a paring knife capable of paring the apple supported on the spit, a gear casing, operating elements of the machine comprising gears and shafts and cams inside of said casing, a shaft moved longitudinally and rocked by said mechanism, said shaft extending through the gear casing and supporting the paring knife outside of the casing, a revolving shaft driven by the elements within the casing and extending out through the casing, said spit carried by and revolving with said shaft.

3. In an apple paring machine, the combination of a paring knife, a single spit adapted to hold and rotate all the apples pared by said knife, a shaft on which said spit is carried and by which it is rotated on a fixed axis, a clutch for intermittently rotating said shaft and spit, said clutch engaging said shaft to drive it by an endwise movement in the clutch along the shaft.

4. In an apple paring machine, the combination of a spit, a shaft supporting said spit and rotating therewith, a second shaft continuously driven for driving the first named shaft, said shafts both having axes in line with each other, and a clutch connecting the second shaft to the first shaft whereby the first shaft is intermittently driven by second shaft.

5. In an apple paring machine, the combination of a spit, a shaft supporting said spit and rotating therewith, a second shaft continuously driven for driving the first named shaft, said shafts both having axes in line with each other and a clutch connecting the second shaft to the first shaft whereby the first shaft is intermittently driven by the second shaft, an apple feeding device adapted to receive an apple at one end of its movement and adapted to place it on the spit at the other end of the movement, means to cause said feeding device to force the apple on the spit when the spit is at rest.

6. In an apple paring machine, the combination of a spit adapted to hold the apples during the paring operation, a corer adapted to cut the core out of the apples held by said spit, said corer being adapted to support the apple and carry it away from the spit, a rod to which the apples are carried by said spit, means for pushing the apples from said corer to said rod, said apples being threaded on said rod in series.

7. In an apple paring machine, the combination of a spit adapted to hold the apples during the paring operation, a corer adapted to cut the core out of the apples held by said spit, said corer being adapted to support the apple and carry it away from the spit, a rod to which the apples are carried by said corer, means for pushing the apples from said corer to said rod, said apples being threaded on said rod in series, a slicing knife at the end of said rod for slicing the apples as they are pushed along the rod.

8. In an apple paring and feeding machine, the combination of a swinging arm, a feeding device carried thereon, a pair of arms pivoted on pivots thereon, jaws at the top of said arms, a spring adapted to draw said jaws together, toggles connecting said arms, a spring adapted to draw said jaws together, toggles connecting said arms adapted to hold said jaws apart when on one side of the center and adapted to let the jaws come together when on the other side of the center, a rod to which said toggles are connected and by which they can be moved in either direction from one side of the center to the other side of the center to open or close the jaws, a spit on which the jaws are adapted to place an apple, an abutment placed on the machine frame is close proximity to the spit, said rod being adapted to engage said abutment to open the jaws and release the apple on the spit.

9. In an apple paring and feeding machine, the combination of a swinging arm, a feeding device carried thereon, a pair of arms pivoted on pivots thereon, jaws at the top of said arms, a spring adapted to draw said jaws together, toggles connecting said arms adapted to hold said jaws apart when on one side of the center and adapted to let the jaws come together when on the other side of the center, a rod to which said toggles are connected and by which they can be moved in either direction from one side of the center to the other side of the center to open or close the jaws, fingers on said arms below the pivots, stops carried on the machine frame with which said fingers engage to hold the jaws open on the downward movement of the feeding device when the toggles have moved to permit the closing of the jaws, a spit on which the jaws are adapted to place an apple, an abutment placed on the machine frame in close proximity to the spit, said rod being adapted to engage said abutment to open the jaws and release the apple on the spit.

10. In an apple paring and feeding machine, the combination of a spit adapted to hold the apples during the paring operation, a corer adapted to cut the core out of the apples held by said spit, said corer being adapted to support the apple and carry it away from the spit, a rod to which the apples are carried by the corer, a feeding device adapted to put a fresh apple on the spit, a stripper carried on the feeding device adapted to push the peeled apple from the corer onto the rod.

11. In an apple paring and feeding machine, a paring head having a plate above supporting a gauge and a plate below supporting a knife with a slot between them, a C shaped narrow bar connecting these plates at the back and leaving the head otherwise open at the sides and back for the passing of the peelings, said bar being shaped to form a recess that extends above and back of the lower edge of the gauge.

12. In an apple paring machine, means for gradually starting and driving the paring mechanism at a desired speed, and driving means for gradually returning the paring mechanism to the starting position at an increased speed.

13. In an apple paring machine, means for gradually starting and driving the paring mechanism at a desired speed, means for gradually returning the paring mechanism to the starting position at an increased speed, a spit, driving means for operating it intermittently, feeding means operating to place apples on the spit while the spit is stationary and paring mechanism operating to peel the apples while the spit rotates.

14. In an apple paring machine having a spit for holding the apple, a turntable bracket, an upright shaft therein, a turntable adapted to swing thereon, slots at the top and bottom of the turntable, a knife carrying arm pivotally mounted in the upper slot adapted to swing in the lower slot, the slots being in line with each other and offset with respect to the axis of the shaft on which the turntable swings, thereby causing the paring head to approach closer to the axis of the spit when the paring operation begins and to stop short of the spit when the paring operation ends.

15. In an apple paring machine, a stationary frame a shaft member, a frame movably mounted thereon, a bracket pivotally mounted in the frame, a turntable supported by the bracket, and a knife pivotally mounted in the turntable and means for moving the shaft member back and forth and swinging it.

16. In an apple paring machine, a stationary frame a shaft member suitably supported thereon, and means mounted on the shaft for coring and paring the apple and means for moving the shaft member back and forth and swinging it.

17. In an apple paring machine, a stationary frame a shaft member suitably supported thereon, a frame slidably mounted on the shaft, a bracket pivotally mounted in the frame, a turntable supported by the bracket, connections between the shaft and the supporting bracket whereby on the turning of the shaft the bracket is rocked without rocking the frame, a paring knife being carried by the turntable and bracket and adapted to rock therewith and means for moving the shaft member back and forth and swinging it.

18. In an apple paring machine, a stationary frame a shaft member suitably supported thereon, a frame slidably mounted on the shaft, a bracket pivotally mounted in the frame, a turntable supported by the bracket, connections between the shaft and the supporting bracket whereby on the turning of the shaft the bracket is rocked without rocking the frame, a paring knife being carried by the turntable and bracket and adapted to rock therewith, an arm member supported on the shaft, a coring spoon carried at the end of the arm, the shaft and coring spoon rocking in one direction and the bracket and the knife rocking in the other direction and means for moving the shaft member back and forth and swinging it.

19. In an apple paring machine, a stationary frame a shaft member slidably and rotatably mounted thereon, a frame having a rectangular opening therein supported on the shaft, the shaft being adapted to make sliding and swivelled connection with the frame, a knife operatively connected to the shaft, a stationary guide member parallel to the shaft, the frame being adapted to engage with the guide and held thereby in an upright position on the shaft, a crank in the rectangular opening fastened rigidly to the shaft and swinging therewith, thereby causing the frame to move with an endwise movement of the shaft, springs connecting the crank and frame, whereby the crank is normally held in position for operating the knife, the springs being adapted to yield for permitting the crank to swing, thereby moving the knife from the paring position.

20. In an apple paring machine, a stationary frame, a shaft member mounted thereon, a turntable slidably positioned on the shaft, a paring knife operatively connected with the turntable, said turntable having a recess in the base thereof with a shoulder on each side of said recess, a rack on the machine comprising a pair of shoulders spaced apart and having a pin in the open space there between, the pin being set upward from the shoulders on the rack in such a manner that the shoulders on the turntable may be located on each side of the pin, the pin being adapted to engage the shoulders on the turntable and to cause the turntable to swing around the pin, the sides of the turntable being adapted to bear on and slide along the rack.

21. In an apple paring machine, the combination of a sliding and rocking shaft, a frame mounted on the shaft, a rectangular opening therein, bosses on each side of the opening, the shaft being adapted to have sliding and swivelled connection with the bosses, a stationary guide in the machine parallel to the sliding shaft, a tongue portion on the bottom of the frame adapted to engage with the guide and hold the frame in an upright position on the shaft.

22. In an apple paring machine, the combination of a sliding and rocking shaft, a frame mounted on the shaft, a rectangular opening therein, bosses on each side of the opening, the shaft being adapted to have sliding and swivelled connection with the bosses, a stationary guide in the machine parallel to the sliding shaft, a tongue portion on the bottom of the frame adapted to engage with the guide and hold the frame in an upright position on the shaft, a crank member in the rectangular opening rigidly attached to the shaft for swinging therewith, thereby causing the frame to move with the shaft.

23. In an apple paring machine, the combination of a sliding and rocking shaft, a frame mounted on the shaft, a rectangular opening therein, bosses on each side of the opening, the shaft being adapted to have sliding and swivelled connection with the bosses, a stationary guide in the machine parallel to the sliding shaft, a tongue portion on the bottom of the frame adapted to engage with the guide and hold the frame in an upright position on the shaft, a crank member in the rectangular opening rigidly attached to the shaft for swinging therewith, thereby causing the frame to move with the shaft, forked end members extending from the crank, a crank lever pivotally mounted between the forked ends, a supporting bracket pivoted in the frame and having bosses at the top thereof, a turntable mounted in the bracket, the forward end of the crank being pivotally connected to the bosses, a knife supported by the turntable, the frame and members supported thereby being operated on the rocking of the shaft for giving movement to the knife.

24. A fruit feeding and paring machine comprising a driving shaft, an auxiliary shaft parallel thereto and driven thereby at a uniform angular velocity, a spit, a clutch for driving it and means for driving the clutch, a cam plate for opening and allowing the clutch to be closed, two pinions mounted on the auxiliary shaft adjacent the cam plate, two mutilated gears of different radii attached to the plate, the gears being placed opposite to the mutilation in the other gear, and the pinions being adapted to mesh intermittently with the mutilated gears for driving the cam plate at different angular velocities.

25. A fruit feeding and paring machine comprising a driving shaft, an auxiliary shaft parallel thereto and driven thereby at a uniform angular velocity, a spit, a clutch for driving it and means for driving the clutch, a cam plate for opening and allowing the clutch to be closed, two pinions mounted on the auxiliary shaft adjacent the cam plate, two mutilated gears of different radii attached to the plate, the gears being placed opposite to the mutilation in the other gear, and the pinions being adapted to mesh intermittently with the mutilated gears for driving the cam plate at different angular velocities, a lug portion extending from the auxiliary shaft between the pinions, a cooperating lug element on the cam plate between the mutilated gears, the lugs being adapted to engage and assist in driving the cam plate with increased angular velocity on the engagement between one pinion and the mutilated gear of short radius, thereby relieving the strain from the cooperating members.

26. In an apple paring machine having a feeding and paring mechanism, a shaft mounted lengthwise on the machine and adapted to rotate at a uniform speed, an auxiliary shaft mounted on the machine transversely thereto and adapted to rotate at a variable speed, means for driving the auxiliary shaft at variable speed from the first named shaft a pair of disks mounted on the auxiliary shaft to rotate therewith, each of the disks having a stud thereon, a sliding cam engaged by each of the studs, the studs being adapted to operate the feeding and paring mechanism.

27. In an apple paring machine having a feeding and paring mechanism, a shaft mounted on the machine, an auxiliary shaft mounted transversely thereto and adapted to rotate at an increased and decreased angular velocity means for driving the auxiliary shaft at variable angular velocity from the first named shaft, a pair of disks mounted on the auxiliary shaft and adapted to rotate therewith, each of the disks having a stud thereon, a sliding cam engaged by each of the studs, the cams being adapted to move forward and backward on the rotation of the auxiliary shaft, a gear casing for enclosing and protecting said disks and cams therein, one of the cam members being adapted to operate the feeding mechanism while the other cam member operates the paring mechanism, and portions of the shaft members being adapted to extend through the casing for moving the feeding and paring mechanism outside thereof.

28. In an apple paring machine having a feeding and paring mechanism, a shaft member, a pair of disk elements mounted on the shaft and adapted to rotate therewith, means for driving the shaft and disk members together at variable angular velocities, an auxiliary shaft member adapted to rock and move endwise, a second shaft member adapted to move endwise, sliding cam elements supported by the auxiliary shaft and second shaft members, a stud on each of the rotating disks, one stud engaging the sliding cam on the auxiliary shaft and the other stud engaging the cam on the second shaft for the purpose of moving the shafts endwise, thereby operating the paring, coring and feeding mechanism, which is supported by the auxiliary shaft and second shaft members.

29. In an apple paring machine having a feeding and paring mechanism, a gear casing for enclosing some of the moving parts of the machine, a shaft member mounted to slide and oscillate therein, said shaft being adapted to extend outside of the casing, a coring spoon supported by the shaft outside of the casing, means inside of the casing for sliding and oscillating the shaft through a regular cycle of movements.

30. In a fruit paring mechanism, a shaft member, a pair of disk elements mounted thereon and adapted to rotate therewith, means for driving the shaft and disks together at variable angular velocities, a second shaft member adapted to rock and move endwise, a third shaft element adapted to move endwise, sliding cam members supported by the second and third shafts, stud elements attached to the disk members for slidably engaging with the cam members, means for supporting the paring and coring mechanism on the second shaft member and the feeding mechanism on the third shaft, a paring knife operatively supported by the second shaft and adapted to be rocked and moved endwise therewith.

31. A fruit paring mechanism comprising a gear casing, a shaft member mounted to slide and oscillate therein, a paring knife supported by a portion of the shaft arranged to extend outside of the casing, an arm member keyed to the shaft, a rotating cam plate adjacent thereto, a stud on the rotating cam plate for slibably engaging with the arm member on the shaft, thereby providing means for driving the shaft back and forth, a flange portion attached to the rotating cam plate for engaging the arm member keyed to the shaft, thereby providing means for rocking the shaft on the rotation of the cam plate.

32. In a fruit paring machine, a spit for rotating the fruit, a shaft member for supporting the spit at one end and a clutch member at the other end of the shaft for giving intermittent motion to the spit, the clutch member comprising a disk having a series of holes arranged concentrically thereon, a shaft in line therewith continuously driven and having a square section, a second clutch element adapted to slide on the square section, the second clutch member having pins thereon adapted to engage with the holes in the other clutch member.

33. In a fruit paring machine, a paring knife, a single spit element adapted to hold and rotate the fruit during the paring operation, a shaft for supporting the spit and by which the spit is rotated on a fixed axis, a clutch member for intermittently rotating the shaft and spit.

34. In a fruit paring machine having two disks mounted upon a shaft and rotating therewith, means for driving the shaft and disks at variable angular velocities, a second shaft adapted to rock and move endwise, a third shaft adapted to move endwise, a sliding cam carried by each of the second and third shafts, a stud on each of the disk members for engaging with the sliding cams, one of said disks mounted on the first shaft having, a flange portion, a stud on the second named shaft contacting therewith, thereby causing the second shaft to rock on the rotation of the cam plate, a raised portion on the periphery of the cam plate, a clutch member adapted to be opened by contact with the raised portion of the cam, a spring for closing the clutch, a spit intermittently driven by the clutch, a paring mechanism and corer carried on the second shaft, a feeding mechanism operated by the third shaft and adapted to place the fruit on the spit, the clutch then operating to cause the spit to rotate, the second shaft then moving endwise in one direction to move the paring mechanism along the fruit on the spit and force the corer into fruit, the shaft moving endwise in the reverse direction with the fruit on the corer, the corer and paring mechanism being then swung sideways by the shaft from the spit in order to permit the operation of the feeding mechanism.

35. In an apple paring machine, the combination of a spit adapted to hold the apples during the paring operation, a corer adapted to cut the core out of the apples held by said spit, said corer being adapted to support the apple and carry it away from the spit, means for bodily moving said corer laterally while maintaining its parallel relation to the axis of the spit.

36. In an apple paring machine, the combination of a spit adapted to hold the apples during the paring operation, a corer adapted to cut the core out of the apples held by said spit, said corer being adapted to support the apple and carry it away from the spit means for bodily moving said corer laterally while maintaining its parallel relation to the axis of the spit, a stripper adapted to push the apple off the corer after the corer has moved sideways away from the stripper means for operating the stripper.

37. In an apple paring machine, the combination of a spit adapted to hold the apples during the paring operation, a knife to pare the apples on the spit, a corer adapted to cut the core out of the apple held by the spit, means for moving the knife and the corer sideways from the spit to permit the placing of an apple on the spit said corer being bodily moved laterally while maintaining its parallel relation to the axis of the spit.

38. In an apple paring machine, the combination of a spit adapted to hold the apples during the paring operation, a knife to pare the apple on the spit, a corer adapted to cut the core out of the apple held by the spit, means for moving the knife and the corer sideways from the spit and in opposite directions to permit the placing of an apple on the spit said corer being bodily moved laterally while maintaining its parallel relation to the axis of the spit.

39. In a fruit feeding and paring machine, the combination of a spit, a clutch for driving said spit intermittently, means for feeding an apple to the spit, means for closing the clutch to turn the spit after the feeding means has moved to place an apple on the spit and has moved away from the apple and the spit.

40. In a fruit feeding and paring machine, the combination of a spit, a clutch for driving said spit intermittently, means for feeding an apple to the spit, means for closing the clutch to turn the spit after the feeding means has moved to place an apple on the spit and has moved away from the apple and the spit, means for opening the clutch as the feeding device moves toward the spit to place the next apple thereon.

41. In an apple paring machine, a spit, and a mount therefor, said spit being adapted to slit the core of the apple lengthwise as the apple is pushed on the spit, a corer adapted to cut the core from the apple close to the spit and remove the balance of the apple from the spit leaving the core on the spit with a thin shell of the apple outside of the spit to hold the core in place thereon, means for moving the corer to cut the core from the apple and remove the apple from the spit.

42. In an apple paring machine, a spit and a mount therefor, said spit being adapted to slit the core of the apple lengthwise as the apple is pushed on the spit, a corer adapted to cut the core from the apple close to the spit and remove the balance of the apple from the spit leaving the core on the spit with a thin shell of the apple outside of the spit to hold the core in place thereon, means for moving the corer to cut the core from the apple and remove the apple from the spit, means for pushing the next apple on the spit whereby the core of the previous apple is pushed off ahead of it and off the spit.

43. In an apple paring machine, a spit and a mount therefor, said spit being adapted to slit the core of the apple lengthwise as the apple is pushed on the spit, a corer adapted to cut the core from the apple close to the spit and remove the balance of the apple from the spit leaving the core on the spit with a thin shell of the apple outside of the spit, means for moving the corer to cut the core from the apple and remove the apple from the spit, the core being held loosely on the spit so that the next apple placed on the spit pushes the core ahead of it and off the spit.

44. In an apple paring machine having a feeding and paring mechanism, a gear casing enclosing some of the moving parts of the machine, a shaft member mounted to slide therein, the shaft being adapted to extend outside of the casing, a feeding device mounted to oscillate outside of the casing, and driven by said shaft, means inside of the casing for sliding the shaft through a regular cycle of movements to move the feeding device.

45. In an apple paring machine having a feeding and paring mechanism, a gear casing enclosing some of the moving parts of the machine, a shaft member mounted to slide and turn therein, the shaft being adapted to extend outside of the casing, a paring device mounted to oscillate and move back and forth outside of the casing, and driven by said shaft, means inside of the casing for sliding and swinging the shaft through a regular cycle of movements to move the paring device.

46. In an apple paring machine having a feeding and paring mechanism, a gear casing enclosing some of the moving parts of the machine, a shaft member mounted to slide and turn therein, the shaft being adapted to extend outside of the casing, a coring spoon mounted on said shaft and moving therewith, means inside of the casing for sliding and swinging the shaft through a regular cycle of movements to move the coring spoon.

47. In an apple paring machine having a feeding and paring mechanism, a gear casing enclosing some of the moving parts of the machine, a shaft member mounted to slide therein, the shaft being adapted to extend outside of the casing, a feeding device mounted to oscillate outside of the casing, and driven by said shaft, means inside of the casing for sliding the shaft through a regular cycle of movements to move the feeding device, a second shaft member mounted to slide and turn therein, the shaft being adapted to extend outside of the casing, a paring device mounted to oscillate and move back and forth outside of the casing, and driven by said shaft, means inside of the casing for sliding and swinging the shaft through a regular cycle of movements to move the paring device.

48. In an apple paring machine having a feeding and paring mechanism, a gear casing enclosing some of the moving parts of the machine, a shaft member mounted to slide therein, the shaft being adapted to extend outside of the casing, a feeding device mounted to oscillate outside of the casing, and driven by said shaft, means inside of the casing for sliding the shaft through a regular cycle of movements to move the feeding device, a second shaft member mounted to slide and turn therein, the shaft being adapted to extend outside of the casing, a paring device mounted to oscillate and move back and forth outside of the casing, and driven by said shaft, means inside of the casing for sliding and swinging the shaft through a regular cycle of movements to move the paring device, a coring spoon mounted on said shaft outside the casing and moving therewith.

49. In an apple paring machine, a spit and means for supporting and rotating it, said spit being adapted to split the core of an apple lengthwise, a corer adapted to cut the core from the apple close to the spit leaving the core on the spit, means for pushing the next apple on the spit whereby the core remaining on the spit is pushed along the spit and off the spit by the succeeding apple.

In testimony whereof I affix my signature.

HENRY MEHSERLE.